Figure 3:
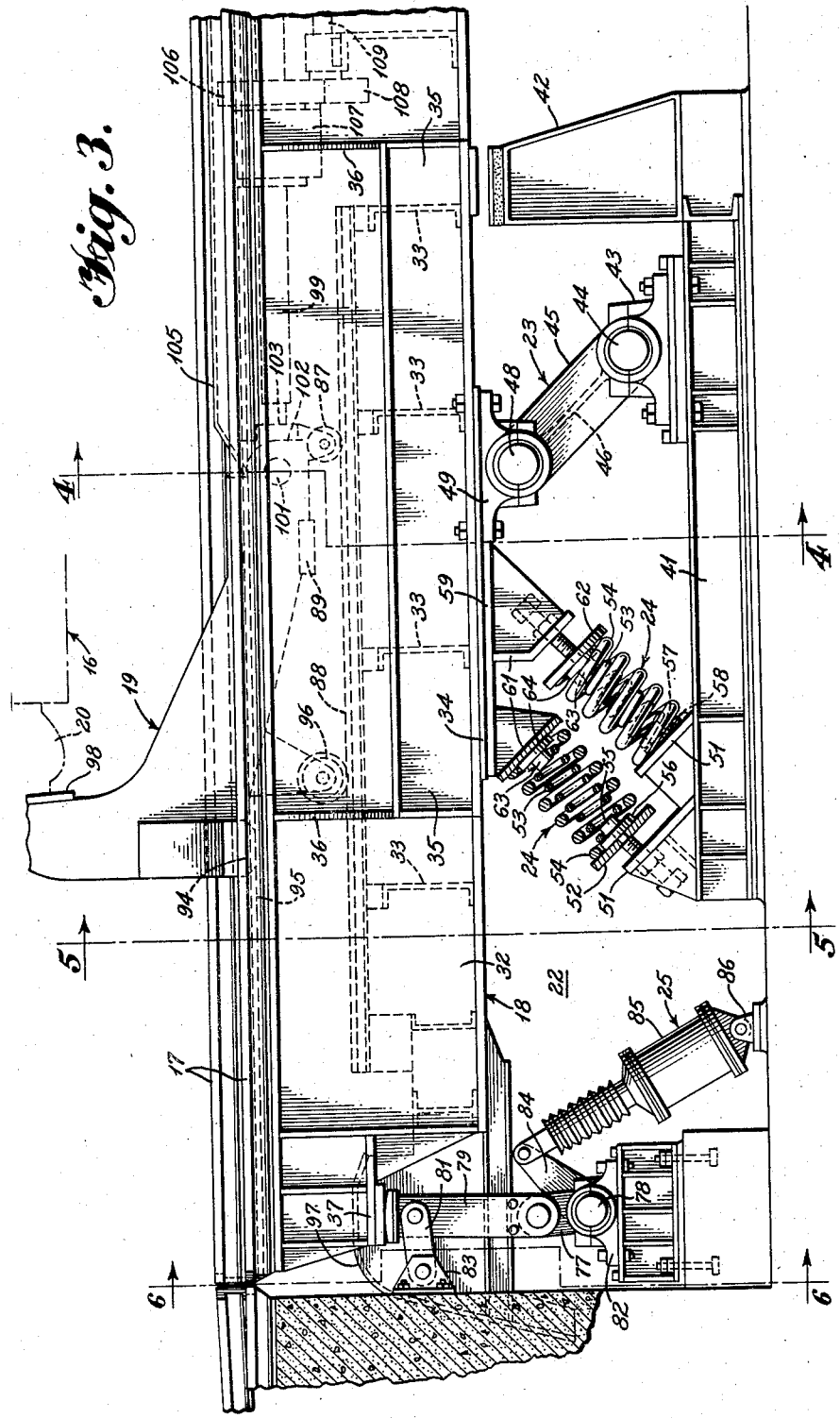

Sept. 2, 1958     A. MUSSCHOOT     2,850,184
RECEPTACLE LOADER AND UNLOADER
Filed Dec. 1, 1954     9 Sheets-Sheet 1
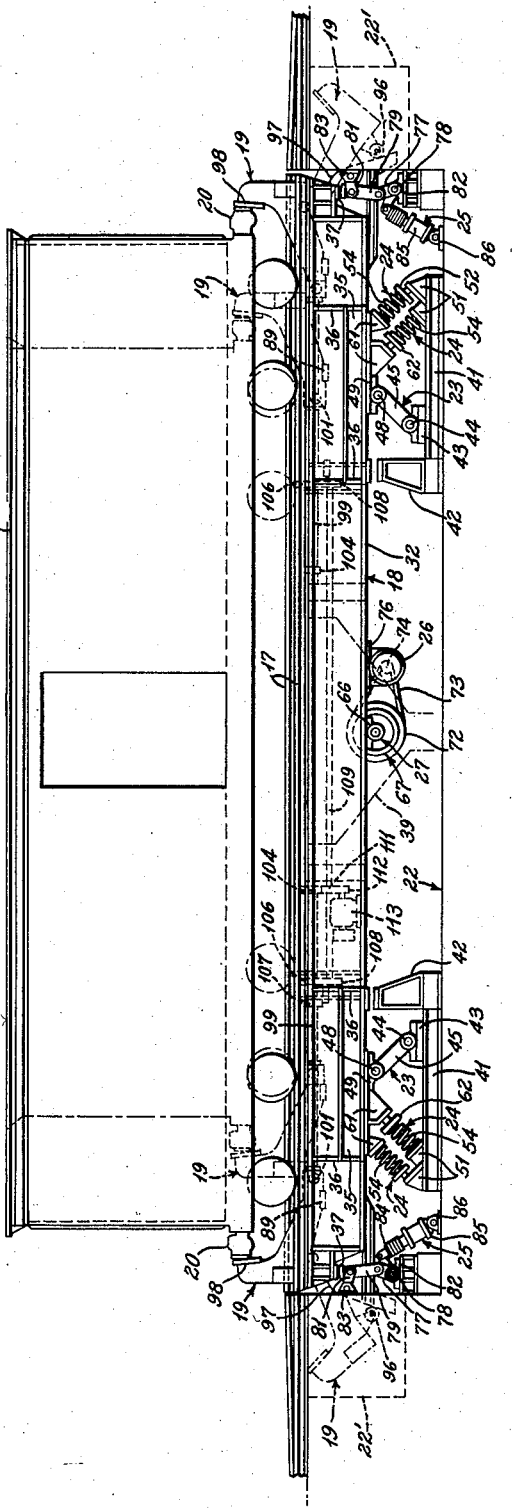

Sept. 2, 1958 A. MUSSCHOOT 2,850,184
RECEPTACLE LOADER AND UNLOADER
Filed Dec. 1, 1954 9 Sheets-Sheet 2

Sept. 2, 1958   A. MUSSCHOOT   2,850,184
RECEPTACLE LOADER AND UNLOADER
Filed Dec. 1, 1954   9 Sheets-Sheet 4

Sept. 2, 1958 — A. MUSSCHOOT — 2,850,184
RECEPTACLE LOADER AND UNLOADER
Filed Dec. 1, 1954 — 9 Sheets-Sheet 5

Sept. 2, 1958 A. MUSSCHOOT 2,850,184
RECEPTACLE LOADER AND UNLOADER
Filed Dec. 1, 1954 9 Sheets-Sheet 6
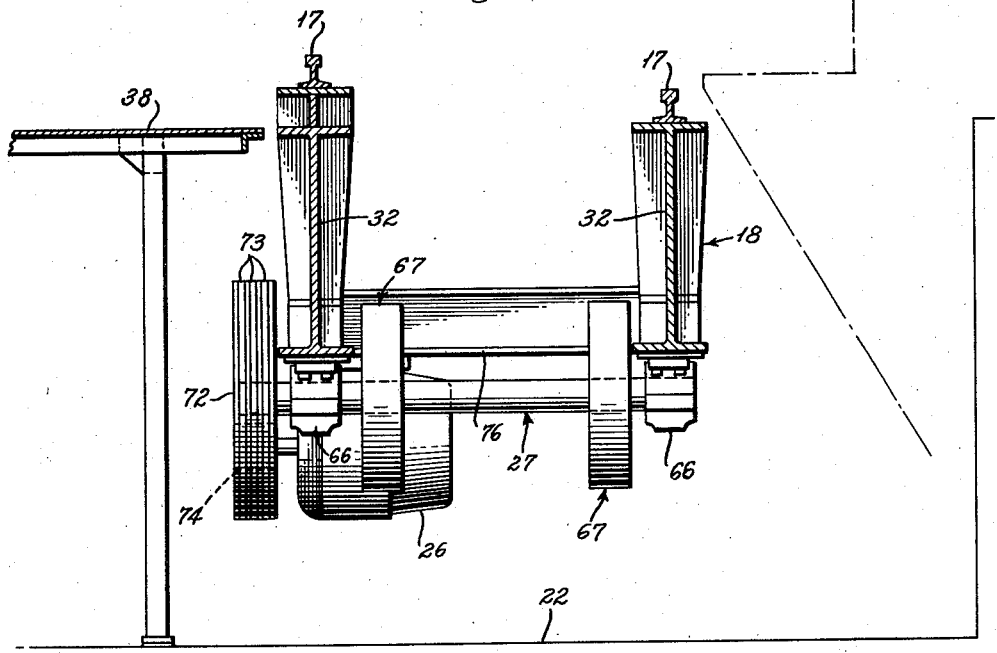
Fig. 9.
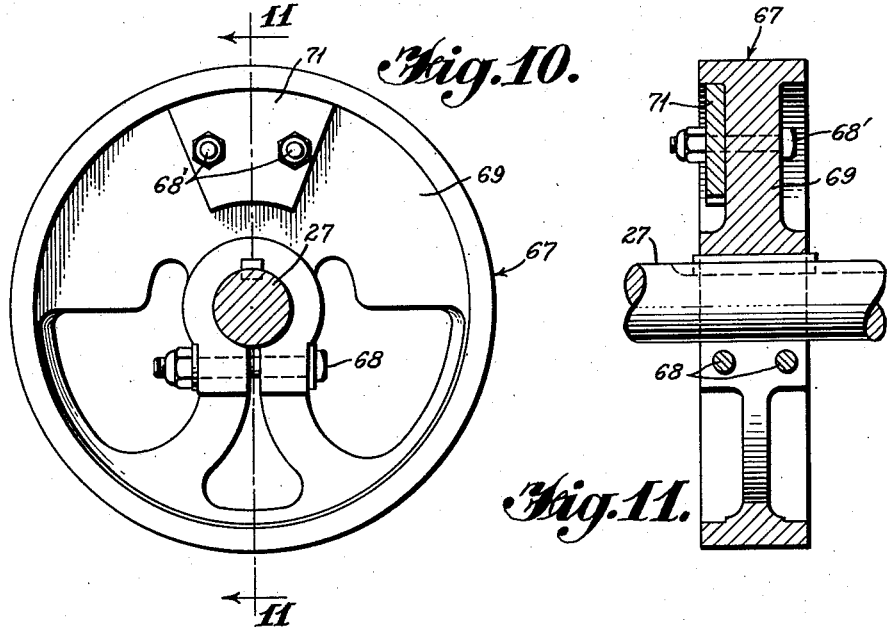
Fig. 10.
Fig. 11.

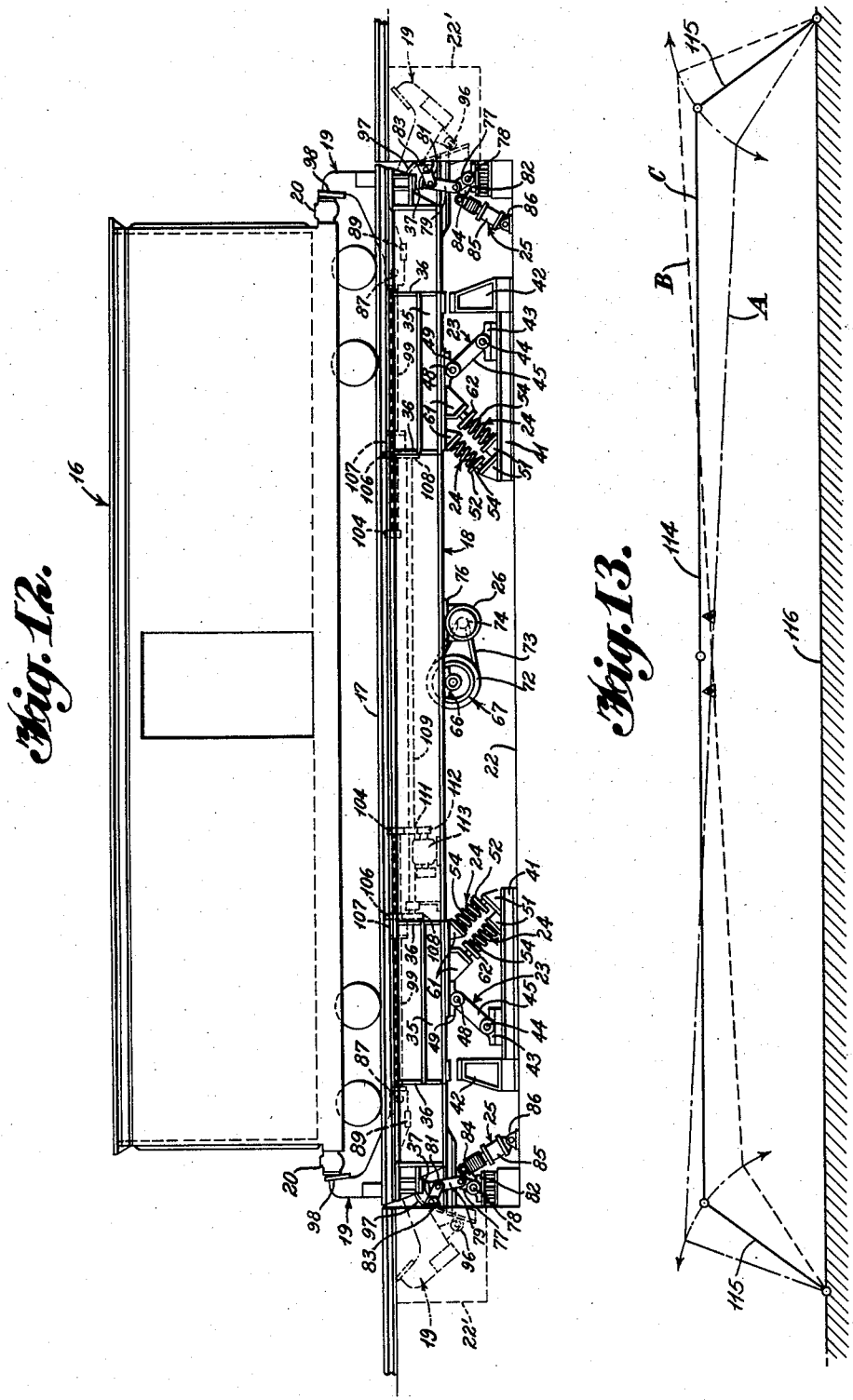

United States Patent Office 2,850,184
Patented Sept. 2, 1958

2,850,184

RECEPTACLE LOADER AND UNLOADER

Albert Musschoot, Park Ridge, Ill., assignor to Link-Belt Company, a corporation of Illinois Application December 1, 1954, Serial No. 472,405

12 Claims. (Cl. 214—53)

This invention relates to new and useful improvements in a method of and apparatus for causing material positioned in a receptacle on opposite sides of a given location to partake of apparently simultaneous movements in opposite directions relative to said location, and deals more particularly with apparatus of the above type which is particularly adapted for use with receptacles having access openings intermediate the ends thereof that represent said given location.

There are many instances in which the transportation and storage of flowable solids such as grains, chemicals, and the like, can best be accomplished by the use of receptacles which are horizontally elongated and have a relatively low height. Such receptacles, however, have not been widely used in the past, except for the transportation of grains in box cars, because of the difficulties encountered in removing material therefrom and introducing material thereto.

Because the transportation of grain in box cars is the most widespread use of the type of receptacles discussed above, the invention will be described in connection with loading and unloading flowable solids relative thereto.

The primary object of this invention is to provide a method of and apparatus for imparting vibratory movement to a receptacle in such a manner as to cause the flowable solids therein on opposite sides of a given location to move apparently simultaneously in opposite directions relative to such location.

Another important object of the invention is to provide apparatus for supporting a receptacle in such a manner that certain movements imparted thereto will cause flowable solid materials on opposite sides of a discharge opening to be conveyed apparently simultaneously in opposite directions toward and through the discharge opening.

Still another important object of the invention is to provide a method of and apparatus for movably supporting a receptacle in such a manner that certain movements imparted thereto will cause flowable solid materials introduced into the receptacle at a central location to flow in opposite directions into the end portions of the receptacle.

A further object of the invention is to provide apparatus which, by a slight rearrangement of certain parts, may be employed for either unloading flowable solids from, or loading and leveling such materials in, a box car, or like receptacle.

Another object of the invention is to cause material positioned in a receptacle on opposite sides of a given location, such as that of an opening in a wall of the receptacle, to partake of apparently simultaneous movements in opposite directions relative to said location by supporting the receptacle on apparatus which, when actuated by an unbalanced shaft vibrator mechanism, will develop movements, impartable to the receptacle, substantially corresponding to those of the connecting rod of a four-bar linkage having non-parallel rocker arms of substantially equal length when both of said arms are caused to oscillate first in one direction and then in the other from their positions of equal angularity relative to the connecting rod.

A still further object of the invention is to provide supporting apparatus of the above mentioned type on which a box car may be positioned and agitated to effect apparently simultaneous movements of flowable solids in opposite directions relative to the opposite end portions of the car.

Other objects and advantages of the invention will be apparent during the course of the following description.

Figure 4:
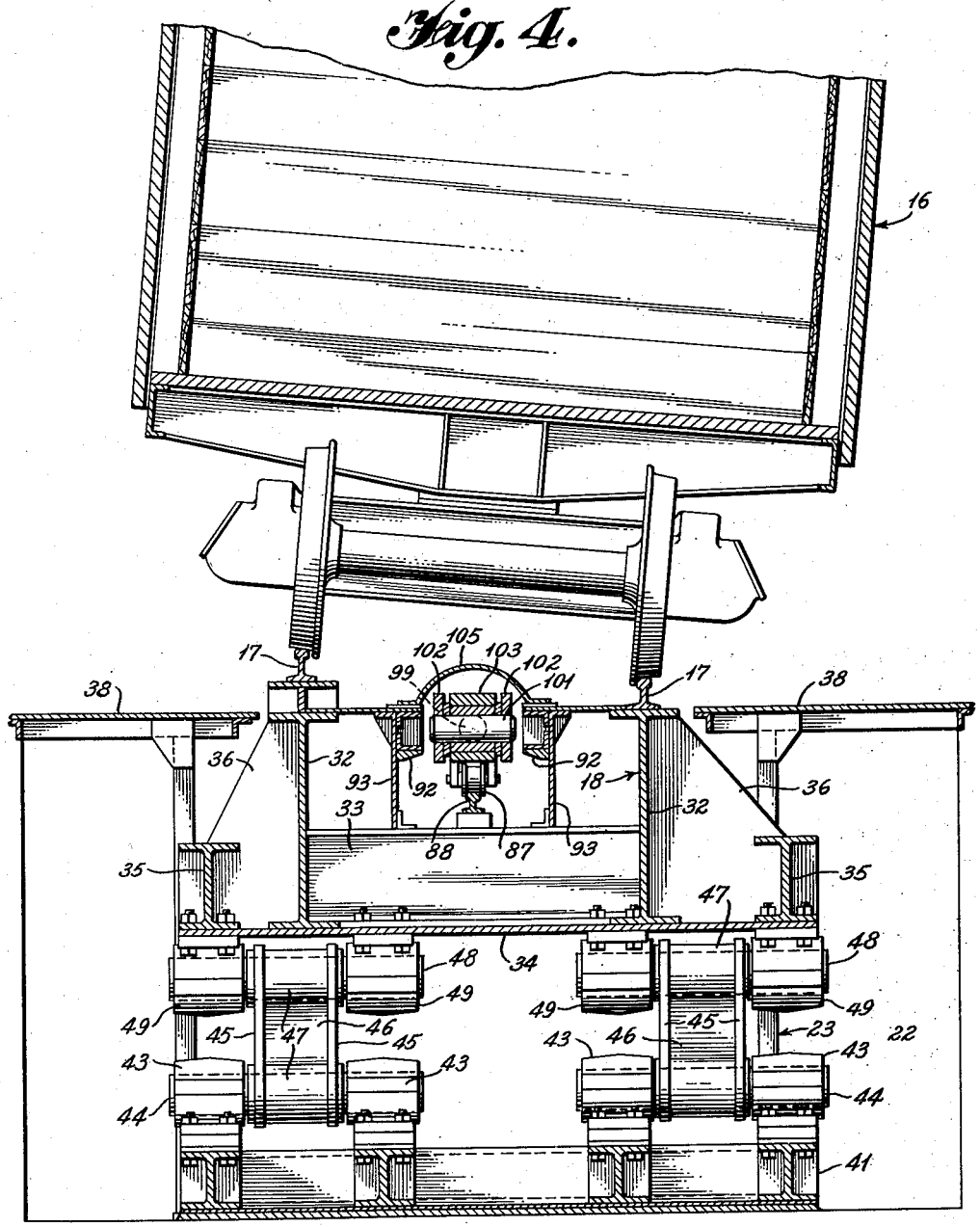
Figure 5:
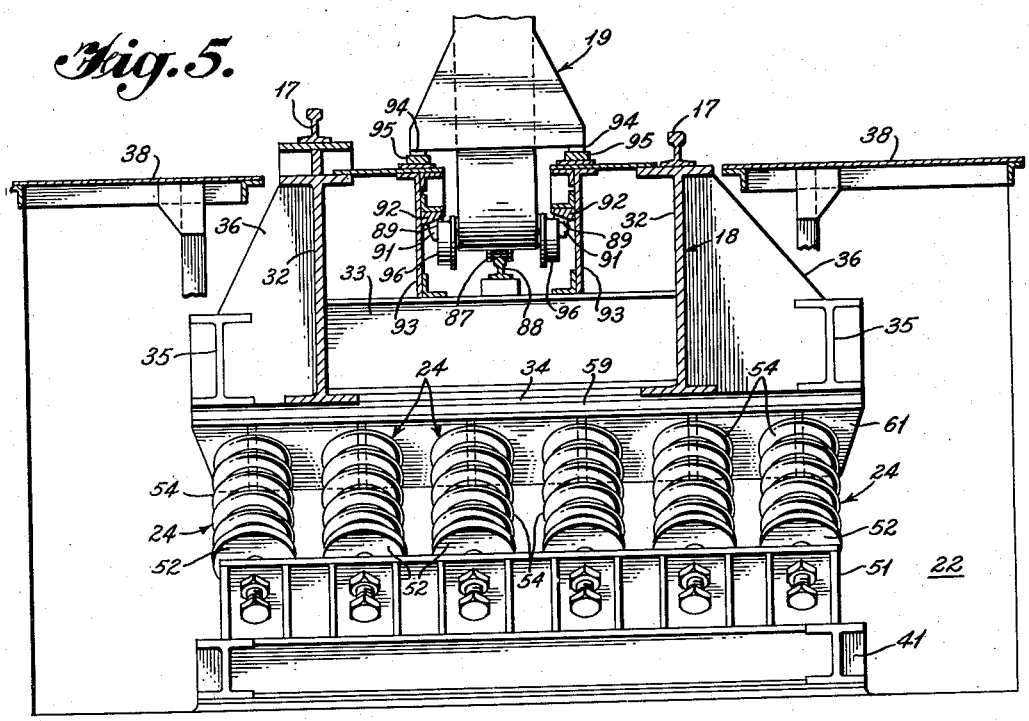
Figure 6:
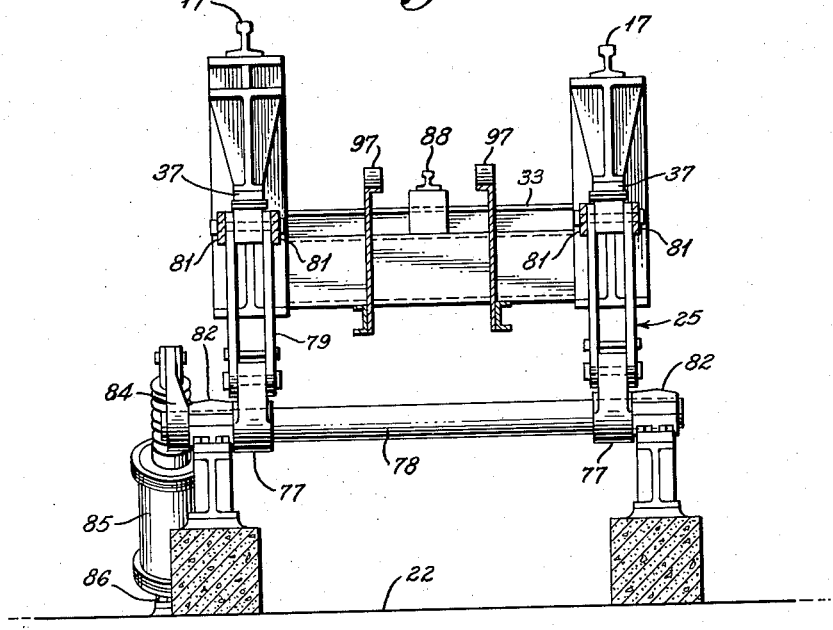
Figure 7:
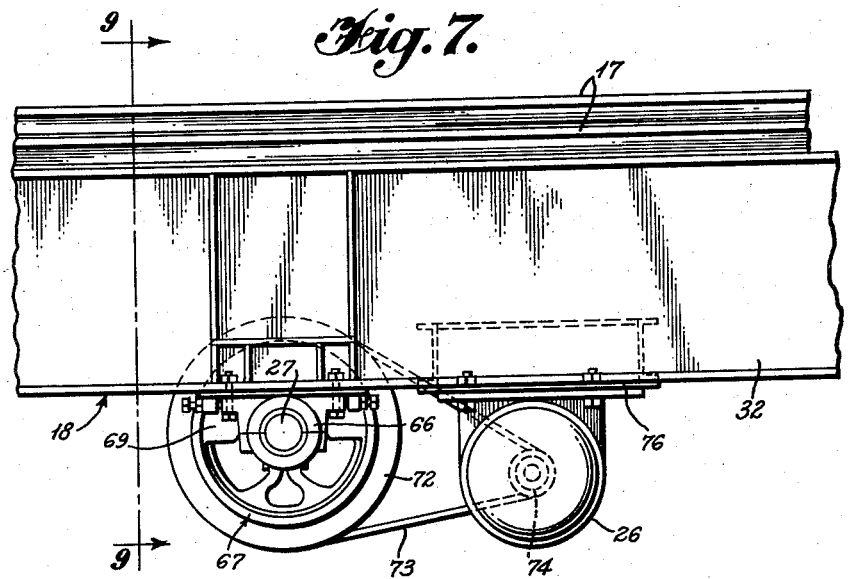
Figure 8:
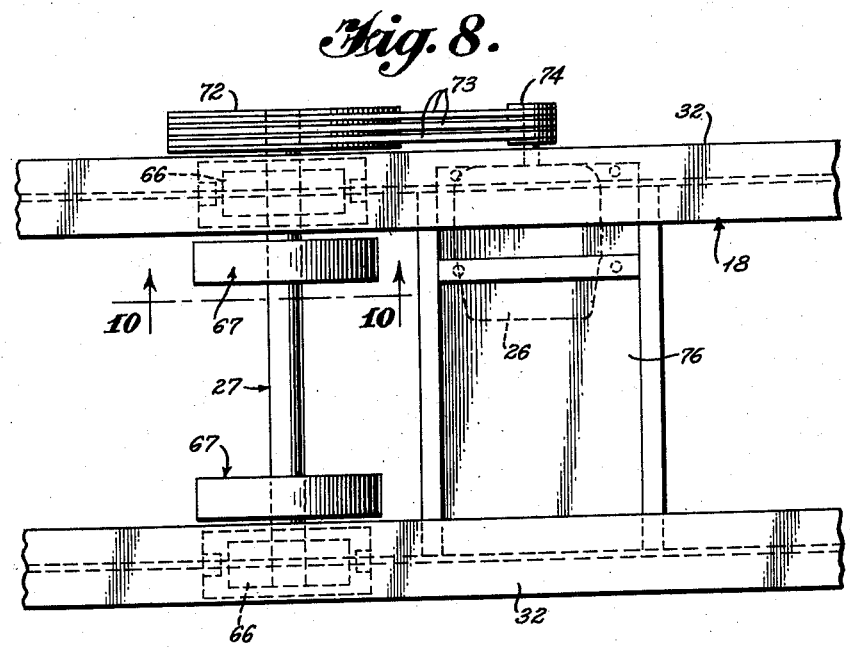
Figure 14:
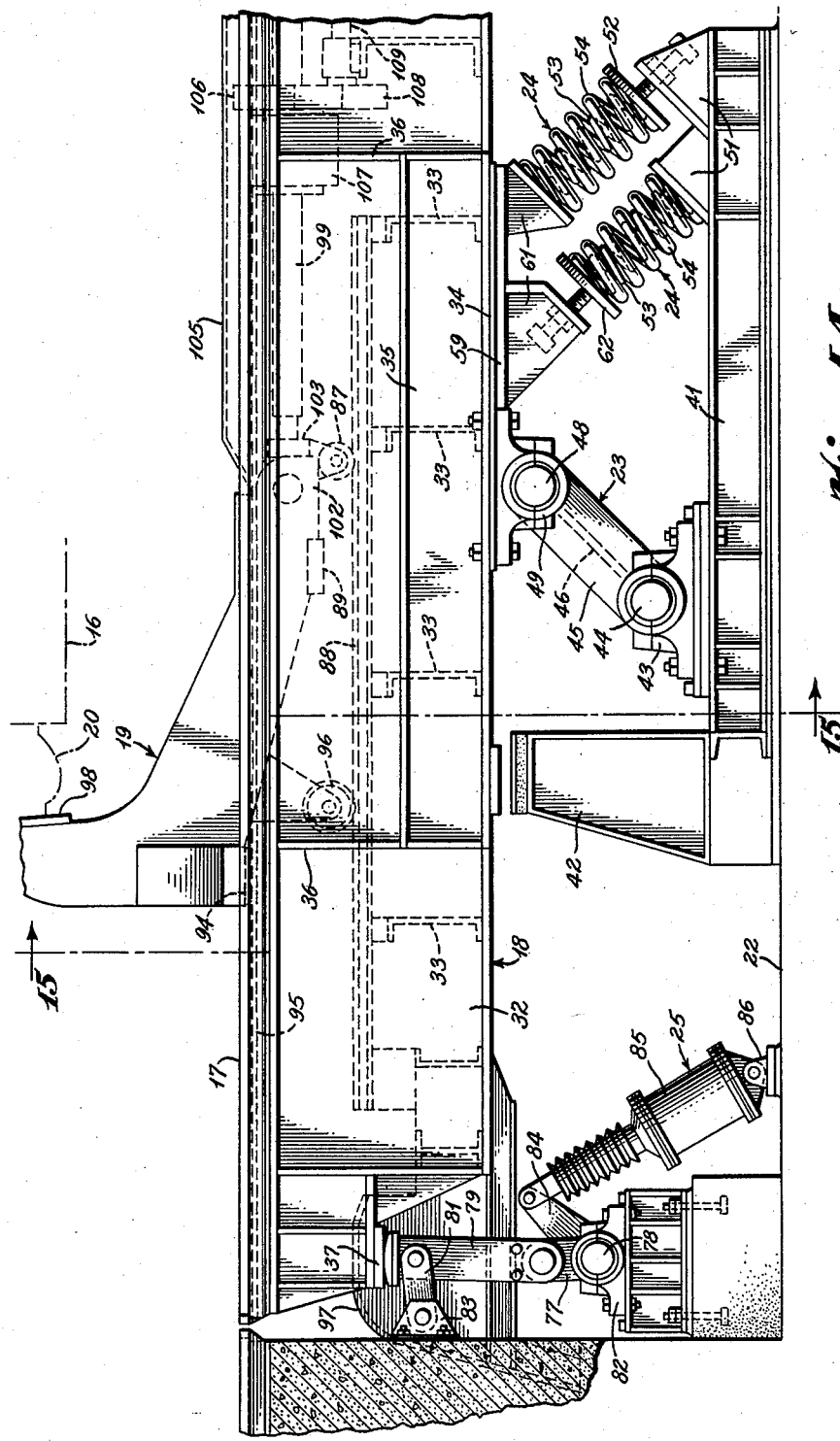
Figure 15:
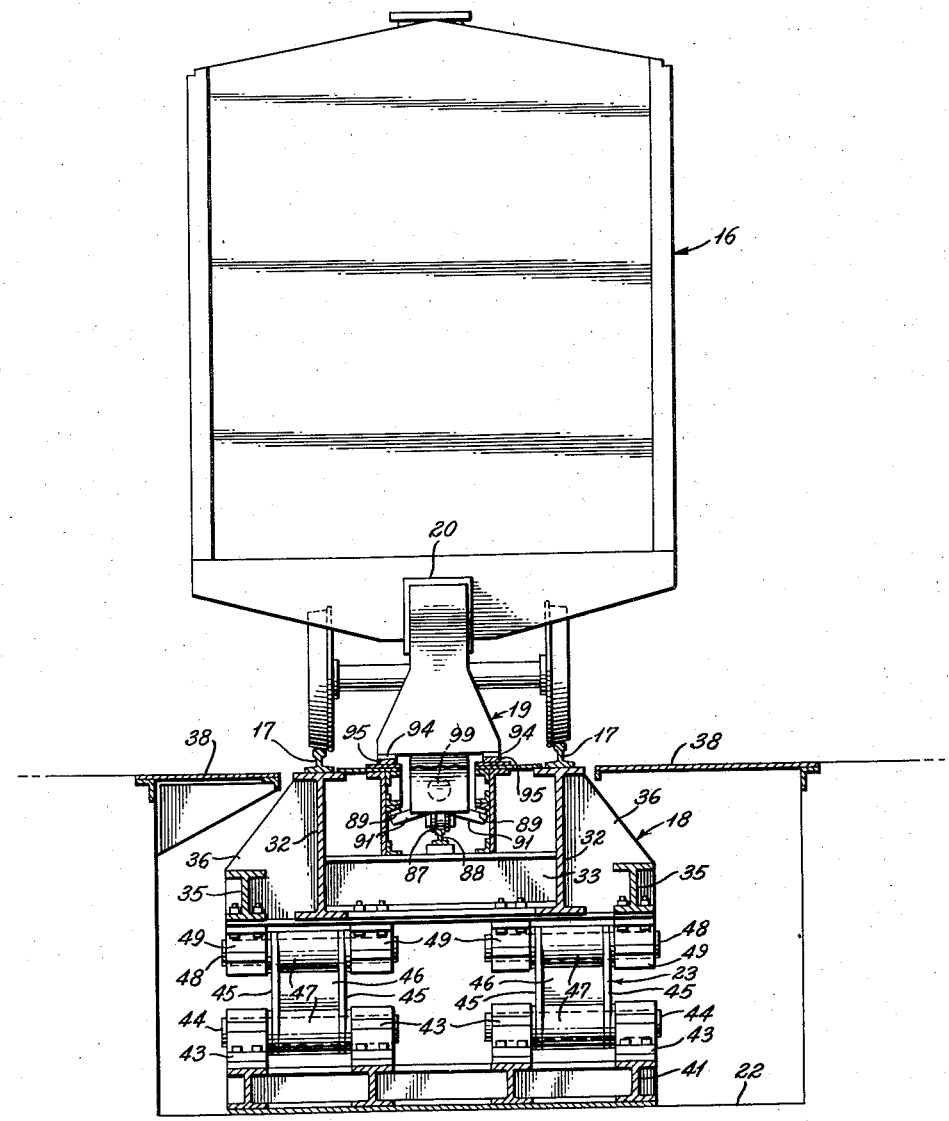

In the accompanying drawings forming a part of this specification and in which like reference characters are employed to designate like parts throughout the same, Figure 1 is a side elevational view of one embodiment of the invention, Figure 2 is a diagrammatic view illustrating a type of linkage that is incorporated in the structure illustrated in Fig. 1, Figure 3 is an enlarged, fragmentary side elevational view of one end portion of the embodiment illustrated in Fig. 1, Figure 4 is a vertical sectional view taken on line 4—4 of Fig. 3, Figure 5 is a vertical sectional view taken on line 5—5 of Fig. 3, Figure 6 is a vertical sectional view taken on line 6—6 of Fig. 3, Figure 7 is a fragmentary side elevational view of the drive employed in the device of Fig. 1, Figure 8 is a top plan view of the drive illustrated in Fig. 7, Figure 9 is a vertical sectional view taken on line 9—9 of Fig. 7, Figure 10 is a vertical sectional view taken on line 10—10 of Fig. 8, Figure 11 is a vertical sectional view taken on line 11—11 of Fig. 10, Figure 12 is a side elevational view of a second embodiment of the invention, Figure 13 is a diagrammatic view illustrating the type of linkage that is incorporated in the embodiment of the invention illustrated in Fig. 12, Figure 14 is an enlarged, fragmentary, side elevational view of one end portion of the device illustrated in Fig. 12, and Figure 15 is a vertical sectional view taken on line 15—15 of Fig. 14.

In the drawings, wherein for the purpose of illustration are shown the preferred embodiments of this invention, and first particularly referring to Fig. 1, reference character 16 designates a box car resting upon rails 17 that are carried by a movable base or platform 18. The box car is centered on the base 18 between the clamping devices 19 which are mounted for movement into engagement with the couplers 20 to restrain the car from movement on the platform, as will be later described. It will be noted that one of the rails 17 is mounted on the base 18 at a greater elevation than the other rail so that the car 16 is supported in a laterally tilted position, as best illustrated in Fig. 4.

The base 18 spans a shallow pit 22 and is supported for movement by supporting arms 23 which are pivotally mounted in the bottom of the pit 22 and extend upwardly and outwardly toward opposite end portions of the car 16 for pivotal connection to the base 18. The base 18 is urged or biased into its neutral position, at which the arms 23 lie at equal and opposite angles with the base, by spring assemblies 24 which are arranged to apply forces to the opposite end portions of the base in directions substantially normal to the arms 23.

At the opposite ends of the pit 22, jacks 25 are provided for engaging the bottom of the base 18 to support the latter against vertical movement during movement of the car 16 thereon.

Lowering of the jacks 25 and actuation of the motor 26 to rotate the unbalanced shaft 27 that is mounted at the center of the base 18 will cause the base to partake of the desired movement to effect discharge of the material loaded in the box car 16.

Referring now to Figs. 3 to 11, inclusive, for a detail description of the several structural units illustrated assembled in Fig. 1 and described generally above, it will be noted that the base 18 is formed with two longitudinally extending I-beams 32 which are positioned beneath the rails 17 and are rigidly maintained in suitably spaced relationship by transversely extending channel beams 33.

Mounted on the bottom and extending laterally from opposite sides of each end portion of the base 18 is a support plate 34, the side edges of which are reinforced by I-beams 35, as best illustrated in Figs. 1 and 3 to 5, inclusive. Webs 36 extend between and connect the I-beams 32 and 35 to structurally reinforce the laterally extended portions of the support plates 34. It will be noted that the support plates 34 extend laterally from the side of the base 18 which has the lower rail 17 mounted thereon for a greater distance than they extend from the opposite side of the base. The center of gravity of the tilted car 16, therefore, will lie in a vertical plane passing substantially through the centerlines of the support plates 34. At each end of the base 18, a step 37 is provided for engagement with the associated jack 25, as will be later described.

A cover plate 38 for the pit 22 is provided at each side of the base 18, as illustrated in Figs. 4, 5 and 9 and a material receiving hopper 39 is illustrated in Figs. 1 and 9 as being mounted in alignment with the longitudinal center of the base 18 and at the side thereof which supports the lower rail 17.

Positioned in the bottom of the pit 22 beneath each one of the end support plates 34 is a mounting base 41 that is formed of suitably reinforced structural members to provide a firm and rigid foundation for the arms 23 and spring assemblies 24.

At the inner end of each mounting base 41, a standard 42 may be provided with its top in vertically spaced relationship with the I-beams 32 to support the base 18 during installation, replacement or repair of the arms 23 or spring assemblies 24. Two laterally spaced pairs of bearings 43 are mounted in transverse alignment at the inner end portion of each mounting base 41 for pivotally supporting the shafts 44 at the lower ends of the arms 23. Each arm 23 is formed of two laterally spaced links 45 which are integral with a longitudinal web 46 and with a bushing 47 at each end portion of the arm. The bushing 47 at the lower end of each arm 23 is mounted on the portion of its associated shaft 44 between the pair of bearings 43 which support the end portions of the shaft. The two arms 23 associated with each of the mounting bases 41 extend upwardly and outwardly toward the adjacent end of the base 18. The upper ends of these arms are connected to the base by shafts 48 which extend through the bushings 47 and have their laterally extending end portions pivotally mounted in spaced pairs of bearings 49 that are connected to the bottom of the associated support plate 34.

The spring assemblies 24 associated with each pair of arms 23 are arranged in two transversely extending, longitudinally spaced rows with six assemblies to each row. Abutments 51 for each row of spring assemblies are provided at the outer end portion of each mounting base 41 and are inclined at substantially the same angle to the base 41 as that of the arms 23.

The abutment 51 for the outer row of spring assemblies is provided with an axially adjustable seat 52 for each assembly against which the lower ends of the inner and outer springs 53 and 54 bear. Each adjustable spring seat 52 is provided with retaining collars 55 and 56 for centering the lower ends of the associated springs 53 and 54. The abutment 51 for the lower ends of the inner row of spring assemblies 24 is provided with collars 57 and 58 for centering the lower ends of the inner and outer springs 53 and 54, respectively, of the associated assemblies.

A spring support plate 59 is mounted on the outer portion of the support plate 34 and is provided with two abutments 61 which are arranged in parallel relationship with and are axially opposed to the two abutments 51. The abutment 61 for the inner row of spring assemblies 24, also, is provided with an axially adjustable seat 62 for each assembly. The adjustable spring seats 62 and the abutment 61 for the outer row of spring assemblies are each provided with collars 63 and 64 for centering the associated ends of the inner and outer springs 53 and 54 of each spring assembly.

As best illustrated in Figs. 7 to 11, inclusive, the unbalanced shaft 27 is rotatably mounted on the bottoms of the I-beams 32 of the base 18 by means of bearings 66 which are located at the longitudinal center of the base. Mounted on the shaft 27 adjacent the inner sides of the beams 32 are the two counterweighted wheels 67 which are best illustrated in Figs. 10 and 11. The wheels 67 are keyed to the shaft 27 for rotation therewith and are clamped to the shaft by the bolts 68 to prevent longitudinal movement relative thereto. The webs 69 of the wheels 67 are so formed that the combined unbalancing weight of the two wheels is concentrated in one radial direction from the shaft 27. Additional counterweights 71 are bolted to the webs 69 to increase the unbalancing action of the wheels.

One end portion of the shaft 27 extends laterally outwardly beyond the side of the base 18 and is provided with a multiple grooved pulley 72 for receiving the V-belts 73 which are driven by a drive pulley 74 on the motor 26 to effect rotation of the shaft 27. The motor 26 is suspended from a base plate 76 that extends between and is connected to the bottoms of the beams 32 of the base 18.

It will be readily apparent that operation of the motor 26 to effect rotation of the shaft 27 will cause the unbalanced weight of the wheels 67 to apply a force to the base 18 which will sweep through 360° and will impart a particular movement to the base.

As illustrated in Figs. 1, 3 and 6, the jack 25 at each end of the pit 22 is formed of a pair of toggle joints which are spaced to underlie the steps 37 of the laterally spaced beams 32. Each of the toggle joints consists of an arm 77 that is mounted on a shaft 78 for rotation therewith and a link 79 that is pivotally connected to the free end of the arm 77 and to a guide link 81. Opposite end portions of the shaft 78 are supported for rotary movement by bearings 82 which are mounted in the bottom of the pit 22 and the guide links 81 are supported for pivotal movement by brackets 83 which are mounted on the end wall of the pit. The arms 77 are rotated by means of a crank arm 84 which is mounted on one end of the shaft 78 and is actuated by a fluid motor 85 that is pivotally mounted on the floor of the pit 22 by means of a bracket 86. It will be readily apparent that rotation of the crank 84 in opposite directions and the resulting rotation of the arms 77 will effect substantially vertical movement of the links 79 into and out of engagement with the steps 37 at the ends of the beams 32.

As illustrated in Fig. 1, a recess 22' is provided at each end of the pit 22 to permit the clamping devices 19 to be moved into inoperative positions below the level of the rails 17. Referring now to Figs. 3 to 6, inclusive, for a detail description of one of the clamping devices 19, it will be noted that the inner end of the device is supported by a center wheel 87 which travels on a rail 88 mounted on the tops of the transverse beams 33. Vertical movement of the center wheel 87 off its rail 88 is prevented by shoes 89 which are mounted on laterally extending brackets 91 and bear upwardly against slide bars 92. The slide bars 92 extend laterally inwardly from the spaced bracket members 93 which are mounted on the transverse beams 33.

The outer end of the clamping device 19 is supported for movement along the base 18 by shoes 94 which rest upon slides 95 at the top of each bracket member 93. The slides 95 terminate at the end of the base 18, at which point wheels 96 on opposite sides of the clamping device are moved into engagement with the trackway 97 which guides the movement of the outer end of the clamping device into its lowered position in its recess 22'. It will be noted that the trackway 97 is mounted on the base 18 to permit the trackway to move with the base. At the outer end portion of the clamping device 19 a vertically extending abutment 98 is provided for movement into engagement with the coupler 20 of a car positioned on the base 18.

The clamping devices 19 are moved from their inoperative positions in the recesses 22' onto and along the end portions of the base 18 by means of oppositely threaded shafts 99. Each shaft 99 is connected at its outer end portion to the inner end portion of the associated clamping device by means of a pin 101 which extends through spaced arms 102 on the clamping device and through the interpositioned eye 103 at the end of the shaft, as is best illustrated in Fig. 4. The outer end portion of the clamping device 19, therefore, is free to pivot downwardly into its associated recess 22' when the wheels 96 are moved along the inclined portion of the trackway 97. The inner end of each threaded shaft 99 is provided with a bearing support 104 that is mounted for longitudinal movement with the shaft. A cover plate 105 for the threaded shaft 99 arcuately spans the space between the tops of the bracket members 93 and is connected to the eye 103 at the outer end of the shaft so that the cover plate will be moved along the base by movement of the shaft.

Longitudinal movement is imparted to each shaft 99 by an internally threaded and externally toothed gear 106 that is supported for rotation in a fixed location by a thrust bearing 107. The gears 106 associated with the two shafts 99 are rotated by pinions 108 mounted on and for rotation with a single countershaft 109 so that rotation of the countershaft will effect simultaneous rotation of the gears 106 and the shafts 99. The countershaft 109 is driven by a gear 111 which meshes with the pinion 112 on the clamping motor 113. It will be readily apparent, therefore, that operation of the clamping motor 113 in one direction will cause the clamping devices 19 to move out of the recesses 22' into their operative positions on the base 18 and into clamping engagement with the couplings 20 of a car positioned on the base. The clamping devices 19, therefore, will automatically center the car 16 on the base 18 and will retain the car in its proper position during movement of the base.

Operation of the clamping motor 113 in a reverse direction will, of course, effect return of the clamping devices 19 to the recesses 22' so that the car 16 can be removed from the base 18. A conventional type of pressure actuated switch, not shown, may be associated with the abutment 98 of one or both of the clamping devices 19 to prevent the application of excessive pressure to the couplings by the clamping devices.

Referring now to Figs. 1 and 2 for a detail description of the operation of the device, the car 16, loaded with grain or other flowable solid material, is moved onto the base 18 and approximately centered on the base in any suitable manner. During this movement of the car 16 onto the base 18, the clamping devices 19 will be in their inoperative positions in the recesses 22', as shown by broken lines in Fig. 1, and the jacks 25 will be in their elevated positions, as illustrated in Fig. 3.

The clamping motor 113 is thereafter set in operation in a direction to cause the clamping devices 19 to move into engagement with the couplers 20 of the car 16 to center the car on the base 18 and to restrain the car against further movement relative to the base. As illustrated by the broken lines in Fig. 1, cars 16 of various lengths may be positioned on the base 18 without effecting the operation of the clamping devices other than to require a greater or lesser movement along the base. It will be noted at this point that the rails adjacent the ends of the pit 22 are arranged at the same difference in elevation as that provided by the rails 17 so that the car 16 will be laterally tilted as it moves onto the base 18 and will be righted as it is removed from the base.

After the car 16 has been properly positioned and clamped on base 18, the fluid motors 85 are actuated to effect lowering of the jacks 25 so that the base 18 is supported for movement with the arms 23. The base is urged into a balanced or horizontal position by the action of the spring assemblies 24. During or after the above described clamping and jack-lowering operations, the door of the car 16 is opened so that a portion of the material adjacent the opening will spill into the material receiving hopper 39.

The drive motor 26 is then set in operation to rotate the shaft 27 and its unbalanced wheels 67 and the rotating forces resulting from the unbalanced action of the wheels will be applied to the base 18 to effect movement of the latter. This movement of the base 18 is opposed by the spring assemblies 24 to the extent that the forces exerted on the base by the spring assemblies at opposite ends thereof are unbalanced. In other words, movement of the base 18 in either direction from its neutral or balanced position is opposed by the spring assemblies 24 at one end of the base and assisted by those at the other end of the base and the difference between these spring forces is applied to the base in a direction tending to return the base to its balanced position. The inertia forces developed at the extremes of each oscillation by the base 18, car 16 and its contents at a given speed of rotation of the shaft 27 are substantially balanced by the difference between the spring forces. Thus, a relatively small force developed by the unbalanced wheels 67 will produce oscillations of sufficient amplitude to cause the contents of the car 16 to be conveyed to and discharged through the center door opening.

The car 16 being supported by and held in a relatively fixed position on the base 18 will move with the base and the material in the opposite end portions of the car will be conveyed by the movement of the car body in opposite directions toward the door of the car. Additionally, the tilted position of the car will cause the material to flow toward the lower side thereof so that the material will spill from the door opening into the material receiving hopper 39.

This conveying action of the car body, and primarily its floor, upon the material in the opposite end portions of the car 16 can best be explained by reference to Fig. 2, in which the connecting rod 18a, the fixed link 22a and the rocker arms 23a correspond to the base 18, the bottom of the pit 22 and the supporting arms 23 of the structure illustrated in Fig. 1. The arms 23a are of equal length and are arranged in non-parallel relationship while the length of the connecting rod 18a is greater than the distance between the pivotal connections of the arms 23a to the fixed link 22a. Similarly, the portion of the base 18 between its pivotal connections to the upper ends of the arms 23 is greater than the spacing between the pivotal mountings of the arms on the bottom of the pit 22. It will be appreciated that the extent of movement of the connecting rod 18a between its extreme positions A and B has been exaggerated to more clearly illustrate the principle of operation of applicant's device.

As illustrated in Fig. 2, the point of pivotal connection between each of the rocker arms 23a and the connecting rod 18a moves upwardly and inwardly along an inclined arcuate path as the point of pivotal connection between the other arm and the connecting rod moves downwardly and outwardly along an oppositely inclined arcuate path when the arms are oscillated relative to the fixed link 22a, the directions of movement of the points of pivotal connection being reversed during successive strokes of each oscillation. As the connecting rod 18a moves in either direction away from, and is subsequently returned to, its position C of equal angularity with the rocker arms 23a, it is tilted downwardly in the direction of its movement and returned to its horizontal position, respectively. It will be readily apparent that any movement of the base 18 must correspond to that of the connecting rod 18a and that the movement of the floor of the box car 16 will substantially conform to that of the base 18.

Considering first the movement of the right-hand end portion of the car 16 as viewed in Fig. 1, it will be seen that vibratory movements of the floor of this end portion of the car between positions A and B of the connecting rod 18a will impart a positive conveying action to the material resting on the floor of this end portion of the car. This conveying action will have a maximum intensity at the end of the car where the angle of inclined movement of the car floor and the distance moved are at their maximum values and a gradually diminishing intensity from the end toward the center of the car. The material in this end portion of the car, therefore, will flow toward the middle portion of the car for discharge through the side door.

As clearly illustrated in Fig. 2, the opposite end portion of the car 16 will be moved in the same manner as the first described end portion but in an oppositely inclined direction and with a phase difference of one hundred and eighty degrees so that the material therein will be subjected to an identical but oppositely directed conveying action during alternate strokes of operation. Since the material in both end portions of the car moves substantially continuously and in opposite directions relative to a fixed location near the middle of the car, there appears to be simultaneous movement of the material in the two end portions toward the car door. Of course, the flowable nature of the material being unloaded will prevent the entire mass of material from moving by increments away from the opposite ends of the car. The positive conveying action imparted by the car, however, will cause the material to flow out of the open door quickly and will effect a complete removal of the material from the car. The tilted condition of the car 16 facilitates the discharge of the material through the door opening.

Referring now to Figs. 12 to 15, inclusive, for a description of the modification of the invention illustrated therein, it will be noted that all of the structural elements of this modification are identical to those of the previously described modification except that the positions of certain of the same have been rearranged to provide a different mode of operation, as will be later described. Corresponding reference characters, therefore, have been applied to the corresponding parts of the two modifications and the description of the modification illustrated in Figs. 12 to 15, inclusive, will be confined to a discussion of the rearranged elements and the manner in which this rearrangement affects the mode of operation of the device.

As illustrated in Figs. 12, 14 and 15, the rails 17 are arranged at the same elevation so that the center of gravity of the car lies in a vertical plane passing through the longitudinal centerline of the base 18. The support plates 34, therefore, are centered transversely of the base 18.

The entire supporting assembly provided at each end portion of the base, and comprising the mounting base 41, the abutment 42, the supporting arms 23, and the spring assemblies 24 with their associated elements, has been rotated 180 degrees in the modification of Figs. 12 to 15, inclusive, so that the supporting arms 23 extend upwardly and inwardly from their associated bearings 43. This rearrangement of the supporting assemblies will cause the base 18 to move in a manner which substantially corresponds to that of the connecting rod 114 of the four-bar linkage illustrated in Fig. 13.

Referring now to Fig. 13 for a description of the movement of the connecting rod 114, it will be noted that this rod extends between and is pivotally connected to rocker arms 115 which are of equal length and are arranged in non-parallel relationship. The rocker arms 115 are pivoted to a stationary link 116 and the length of the link 116 is greater than that of the connecting rod 114 so that the arms are inclined upwardly and inwardly from their points of pivotal connection with the link 116. When the connecting rod 114 is set in motion, the rocker arms 115 will oscillate so that the pivot point between each rocker arm and the connecting rod will move upwardly and outwardly along an inclined arcuate path while the pivot point between the other rocker arm and the connecting rod moves downwardly and inwardly along an oppositely inclined arcuate path, the directions of movement of the pivot points being reversed during successive strokes of each oscillation. Such movement of the connecting rod 114, therefore, will cause it to be tilted downwardly in a direction opposite its direction of longitudinal movement.

Movement of the base 18 of Fig. 12 will effect a similar movement of the car 16 positioned thereon to cause material introduced into the middle of the car through the side door to move in opposite directions toward the opposite end portions of the car. The conveying action of the car floor to move the material in opposite directions from the door of the car can best be explained by reference to Fig. 13, where movement of the connecting rod 114 between its positions A and B corresponds to movement of the car floor.

Considering first the movement of the right-hand half of the connecting rod 114, it will be seen that vibratory movements of the floor of this end portion of the car between positions A and B will impart the positive conveying action to the material resting on the floor of this end portion of the car. This conveying action will increase in intensity from the middle to the end of the car and will reach a maximum value at the end of the car where the angle of inclined movement of the floor and the distance moved are at their maximum values. The material in this end portion of the car, therefore, will flow from the middle toward the end of the car.

The opposite end portion of the car 16 will be moved in the same manner as the first described end portion but in an oppositely inclined direction and with a phase difference of one hundred and eighty degrees so that the material therein will be subjected to an identical but oppositely directed conveying action during alternate strokes of operation. Since the material in both end portions of the car moves substantially continuously and in opposite directions relative to a fixed location near the middle of the car, there appears to be simultaneous movement of the material in the two end portions toward the ends of the car. Of course, the flowable nature of the material will cause its depth at the middle of the car to build up as the depth of the material in the end portions of the car increases and suitable provision must be made to prevent spilling of the material at the middle of the car through the lower portion of the door.

The operation of the modification of Figs. 12 to 15, inclusive, will be briefly described as follows:

An empty car 16 is positioned on the base 18 with the jacks 25 in their elevated positions, and after the clamping devices 19 have been actuated to center and retain the car on the base, the jacks are lowered so that the base is freed for movement with the supporting arms 23, the movement being resisted by the difference in the forces exerted on the base by the spring assemblies 24. The drive motor 26 is thereafter set in operation to impart the above described movement to the base 18 and material is introduced into the central portion of the car where it is conveyed in opposite directions toward the opposite end portions of the car.

The upright, or untilted, position of the car 16 in Figs. 12 to 15, inclusive, will cause the material to be maintained at a laterally uniform depth during the above described loading operation. It is to be understood, however, that the longitudinal conveying action imparted to the material by the car will not be affected by a tilting of the car, such as illustrated in Figs. 1 to 11, inclusive.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A device for moving the material in opposite end portions of a railway car in opposite directions relative to the middle portion of the car, comprising supporting means including a base having rails mounted thereon for receiving a railway car, means movable into clamping engagement with two opposed portions of the car for retaining the car properly positioned on the rails during movement of the base, means supporting said base for vibratory movement of the opposite end portions thereof alternately in opposite directions along oppositely inclined paths, and means supported solely on and imparting vibratory movement to said base to cause the aforesaid relative movements of the material in the car.

2. A device for moving the material in opposite end portions of a railway car in opposite directions toward the middle portion of the car for discharge through a centrally located side wall opening, comprising a base having rails mounted thereon for receiving a railway car, means for retaining the car properly positioned on the rails for movement with the base, pivotally mounted supporting arms of equal length arranged at two spaced locations and extending upwardly and outwardly from their mountings for connection to said base at acute angles with the portion of the base between said arms, a plurality of springs associated with said base for urging the arms into positions of equal angularity relative to said base, and means for imparting vibratory movement to said base to cause said arms to oscillate in both directions from said positions of equal angularity, said springs limiting said oscillations to maintain said acute angular relationship between said arms and base, the movement of the base effecting the aforesaid movements of the material in the car.

3. A device for moving the material in opposite end portions of a railway car in opposite directions toward the middle portion of the car for discharge through a centrally located side wall opening, comprising a base having rails mounted at different elevations thereon for receiving and laterally tilting a railway car, means for longitudinally positioning a car on said rails and for retaining the car for movement with the base, pivotally mounted supporting arms of equal length arranged at two longitudinally spaced locations and extending upwardly and outwardly in opposite directions from their mountings for connection to said base at acute angles with the portion of the base between said arms, a plurality of springs associated with opposite end portions of said base for urging the arms into positions of equal angularity relative to said base, and means for imparting vibratory movement to said base to cause said arms to oscillate in both directions from their positions of equal angularity relative to said base to effect the aforesaid movements of the material in the car.

4. A device for moving the material in opposite end portions of a railway car in opposite directions toward the middle portion of the car for discharge through a centrally located side wall opening, comprising a base having rails mounted thereon for receiving a railway car, means for longitudinally positioning a car on said rails and for retaining the car for movement with the base, pivotally mounted supporting arms of equal length arranged at positions that are equally longitudinally spaced from the center of said base, said arms extending upwardly and outwardly from their mountings for connection to said base at acute angles with the portion of the base between the arms to support the base for vibratory movements of its opposite end portions alternately in opposite directions along upwardly and inwardly inclined paths, a plurality of springs arranged in groups to engage said base at separate locations spaced in opposite directions and at equal distances from the center of the base to oppose movements of the end portions of the base alternately downwardly and outwardly along their paths of movement, and rotatable unbalanced mechanism mounted on the base in a position centered longitudinally of the latter for operation to effect said vibratory movements of the base and the associated railway car.

5. A device for moving the material in opposite end portions of a railway car in opposite directions toward the middle portion of the car for discharge through a centrally located side wall opening, comprising a base having rails mounted thereon for receiving and laterally tilting a railway car, means for centering a car longitudinally of said base and for retaining the car for movement with the base, pivotally mounted supporting arms of equal length arranged at positions that are equally longitudinally spaced from the center of said base, said arms extending upwardly and outwardly from their mountings for connection to said base at acute angles with the portion of the base between the arms to support the base for vibratory movements of its opposite end portions alternately in opposite directions along upwardly and inwardly inclined paths, a plurality of springs arranged in groups to engage said base at separate locations spaced in opposite directions and at equal distances from the center of the base to oppose movements of the end portions of the base alternately downwardly and outwardly along their paths of movement, and rotatable unbalanced mechanism mounted on the base in a position centered longitudinally of the latter for operation to effect said vibratory movements of the base and the associated railway car.

6. A device for moving the material in opposite end portions of a railway car in opposite directions toward the middle portion of the car for discharge through a centrally located side wall opening, comprising a base having rails mounted at different elevations thereon for receiving and laterally tilting a railway car, a pair of clamps movable on said base to engage opposite ends of a railway car positioned on the rails to center said car longitudinally of the base and to retain the car for movement with the base, pivotally mounted supporting arms of equal length arranged at positions that are equally longitudinally spaced from the center of said base, said arms extending upwardly and outwardly from their mountings for connection to said base at acute angles with the portion of the base between the arms to support the base for vibratory movements of its opposite end portions alternately in opposite directions along upwardly and inwardly inclined paths, a plurality of springs arranged in at least two groups with the groups positioned to engage said base at separate locations spaced in opposite directions and at equal distances from the center of the base to oppose movements of the end portions of the base alternately downwardly and outwardly along their paths of movement, and rotatable unbalanced mechanism mounted on the base in a position centered longitudinally of the latter for operation to effect said vibratory movements of the base and the associated railway car.

7. The method of moving in opposite directions the flowable solid material positioned in the opposite end portions of a horizontally elongated receptacle having a centrally located opening through which material passes while the material in the receptacle is being moved, comprising subjecting the material in one end portion of the receptacle to a positive conveying action by vibrating the surfaces of the receptacle which support the material at said one portion alternately upwardly and downwardly along a path inclined upwardly in the desired direction of movement of the material to impart movement to the latter in such direction, and subjecting the material in the other end portion of the receptacle to the same but oppositely directed positive conveying action by vibrating the material supporting surfaces of said other end portion of the receptacle alternately downwardly and upwardly along a path that is inclined in a direction opposite that of the aforementioned path simultaneously with the upward and downward movements of the surfaces for supporting the material in said one portion of the receptacle.

8. The method of moving in opposite directions the flowable solid material positioned in the opposite end portions of a horizontally elongated receptacle having a centrally located opening through which material passes while the material in the receptacle is being moved, comprising subjecting the material in opposite end portions of the receptacle to positive, oppositely directed conveying actions by vibrating the surfaces of the receptacle which support the material at said opposite end portions alternately upwardly and downwardly and in opposite directions along oppositely inclined paths to impart movement to the material at each end portion in the direction toward which the path of movement of the end portion is upwardly inclined, and substantially balancing the inertia forces developed by the vibratory movements of the receptacle and the material therein by yieldably opposing movement of each end portion of the receptacle downwardly along its inclined path.

9. The method of removing flowable solid material from a railway car having a centrally located side wall opening with a removable closure therefor, comprising supporting said car in a laterally tilted position with its opening on the lower side thereof, removing the closure from said opening to discharge by gravitational flow a portion of the material from the car, conveying the material remaining at one end portion of the car to the opening for gravitational flow therethrough by vibrating said end portion alternately upwardly and downwardly along a path inclined upwardly and inwardly toward the center portion of the car to impart movement to the material in said end portion in the direction of said inclination, and similarly conveying the material remaining at the other end portion of the car in the opposite direction to the opening for gravitational flow therethrough by vibrating the latter end portion alternately downwardly and upwardly along a path that is inclined upwardly and inwardly toward the center portion of the car simultaneously with the upward and downward movements of the opposite end portion of the car.

10. The method of moving flowable solid material in opposite end portions of a box car in opposite directions relative to the side wall opening at the center portion of said car through which material passes while the material in the end portions of the car is being moved, comprising supporting said car for alternate vibratory movements of the opposite ends thereof in opposite directions along oppositely inclined paths, and vibrating said car to impart said alternate movements thereto for applying a positive conveying action to the material in opposite end portions of the car in opposite directions.

11. The method of moving flowable solid material in opposite end portions of a box car in opposite directions relative to the side wall opening at the center portion of said car through which material passes while the material in the end portions of the car is being moved, comprising supporting said car for alternate vibratory movements of the opposite ends thereof in opposite directions along oppositely inclined paths, vibrating said car to impart said alternate movements thereto for applying a positive conveying action to the material in opposite end portions of the car in opposite directions, and yieldably resisting said alternate movements of the car to urge the car toward a horizontal position.

12. The method of moving flowable solid material in opposite end portions of a box car in opposite directions toward the center side wall opening of the car for discharge through said opening in a continuous stream, comprising moving said car into a laterally tilted position with said side wall opening on the lower side thereof, supporting said car for vibratory movements of the opposite ends thereof alternately upwardly and downwardly and in opposite directions along upwardly and inwardly inclined paths, vibrating said car to impart said alternating movements thereto for applying a positive conveying action to the material in opposite end portions of the car toward the center side wall opening for continuous flow therethrough, and yieldably resisting the movements of each end of the car in a downwardly inclined direction to balance the inertia forces developed by said vibratory movements of the car and the material therein.

References Cited in the file of this patent

UNITED STATES PATENTS

| | | |
|---|---|---|
| 736,753 | Marcus | Aug. 18, 1903 |
| 1,209,621 | Richardson | Dec. 19, 1916 |
| 1,330,679 | Brown | Feb. 10, 1920 |
| 1,542,951 | Perkins | June 23, 1925 |
| 1,593,303 | Hill | July 20, 1926 |
| 1,968,711 | Savy | July 31, 1934 |
| 2,610,040 | Emmons | Sept. 9, 1952 |
| 2,655,275 | Thompson | Oct. 13, 1953 |

FOREIGN PATENTS

| | | |
|---|---|---|
| 7,495 | Great Britain | Apr. 23, 1901 |
| 10,959 | Australia | June 15, 1928 |
| 294,955 | Great Britain | Dec. 27, 1928 |
| 64,386 | Denmark | Apr. 8, 1946 |